UNITED STATES PATENT OFFICE.

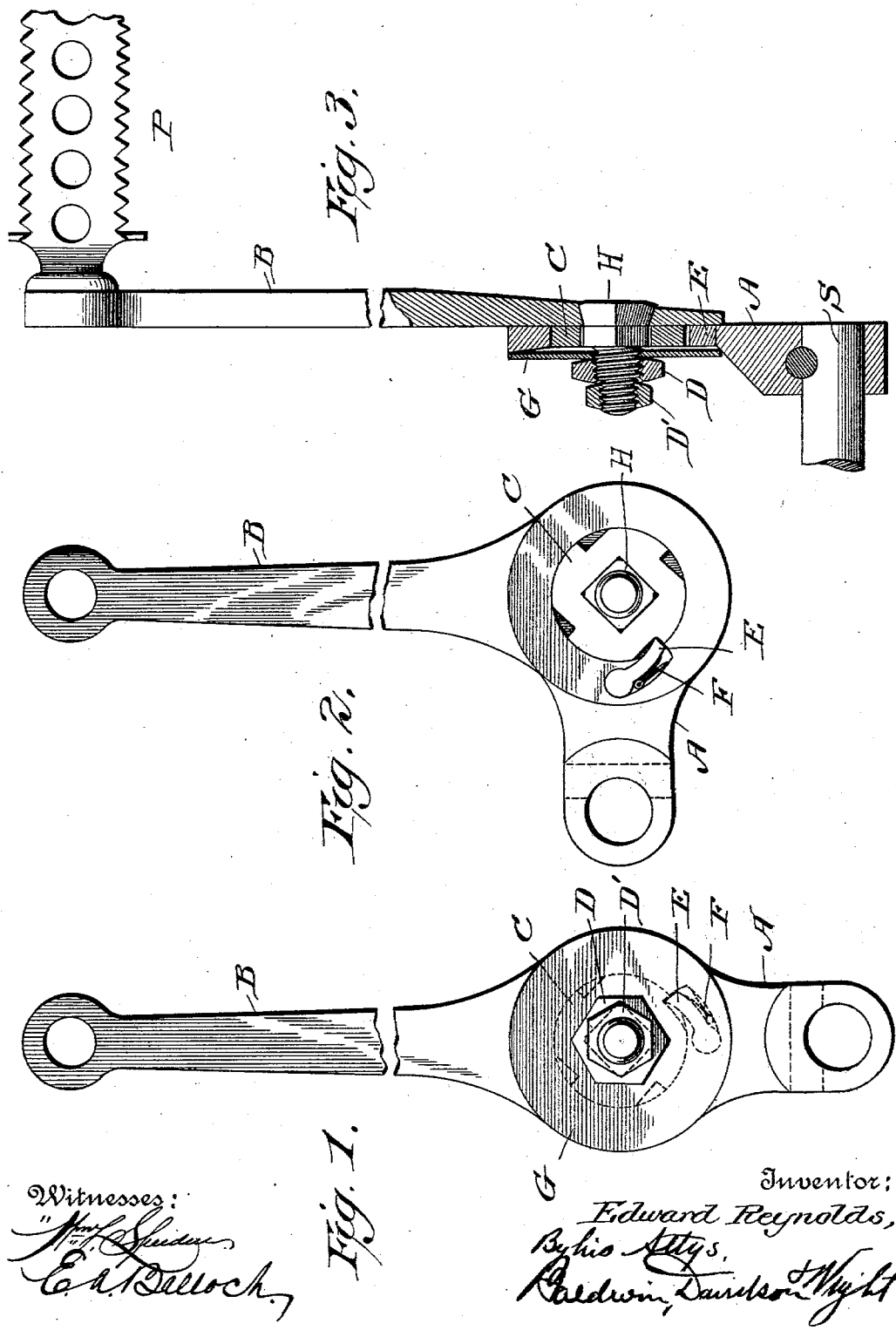

EDWARD REYNOLDS, OF CLIPSTON RECTORY, ENGLAND.

BICYCLE-CRANK.

SPECIFICATION forming part of Letters Patent No. 629,921, dated August 1, 1899.

Application filed December 28, 1897. Serial No. 664,077. (No model.)

*To all whom it may concern:*

Be it known that I, EDWARD REYNOLDS, clerk in holy orders, a subject of the Queen of Great Britain, residing at Clipston Rectory, in the county of Northampton, England, have invented certain new and useful Improvements in Bicycle-Cranks, of which the following is a specification.

According to this invention I make the arm of the crank in two parts and bolt them together side by side near their ends by a joint-pin, the construction being such that the parts can turn relatively to each other in one direction, but always with considerable friction between them, while their motion relatively to each other in the other direction is limited by a pawl on one part, which engages with a ratchet on the other part.

Figure 1 is a side elevation. Fig. 2 is a side elevation with the nuts D D' and spring-washer G removed and the part A in another position. Fig. 3 is a vertical transverse section.

A and B are the two parts of the crank, the part A being preferably shorter than the part B and fixed to the driving-shaft S of the machine, while the part B has the pedal P pivoted to it. These two parts are connected together by a bolt H, nut D, and lock-nut D'. The part A is concave on one side, and G is a spring-washer interposed between its concave face and the nut D. By tightening or loosening the nut D the friction between the parts A and B can be regulated.

The part B of the crank has a ratchet-wheel C fixed to it by means of the bolt H, (which is square in cross-section,) and the part A carries a pawl which engages with the ratchet-wheel C. The latter is shown with four teeth, and this is a convenient number. The pawl E is pressed inward by a spring F. By means of the ratchet and pawl B is prevented from turning relatively to A more than a quadrant in forward direction; but when the rider back-pedals hard enough to overcome the resistance of the joint the pawl disengages and B will revolve about the axis of H into any other angular relation to A that may be desired. The teeth should be so arranged in the ratchet as to lock A and B in the most useful relative positions for riding under more or less favorable conditions—say at the inclinations giving full, mean, or shortest effective lengths of crank for uphill, level, or down gradient, respectively. It is essential that the friction between the parts should be sufficient to prevent them from turning on each other during the ordinary upcast of the rider's foot.

What I claim is—

The combination of an axle, a pedal, a crank divided into two parts pivotally connected together, one part being fixed to the axle and the other part pivoted to the pedal, a pawl carried by one part and ratchet-teeth in the other part, and friction devices impeding the turning of the parts relatively to each other.

EDWARD REYNOLDS.

Witnesses:
 FRED FELLOWES WIGGINS,
 GEORGE WILLIAM COLTMAN.